(12) United States Patent
King (10) Patent No.: US 8,560,603 B2
(45) Date of Patent: Oct. 15, 2013

(54) COMPUTERIZED COMMUNITY COMMUNICATION AND COLLABORATION

(75) Inventor: Brian King, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 611 days.

(21) Appl. No.: 12/131,913

(22) Filed: Jun. 2, 2008

(65) Prior Publication Data

US 2009/0300114 A1    Dec. 3, 2009

(51) Int. Cl.
*G06F 15/16*    (2006.01)

(52) U.S. Cl.
USPC .......................................... 709/204

(58) Field of Classification Search
USPC .......................................... 709/204
See application file for complete search history.

(56) References Cited

U.S. PATENT DOCUMENTS

| | | | |
|---|---|---|---|
| 6,433,795 B1 | 8/2002 | MacNaughton et al. | |
| 6,708,172 B1 | 3/2004 | Wong et al. | |
| 6,993,657 B1 | 1/2006 | Renner et al. | |
| 7,246,145 B1 | 7/2007 | Gits et al. | |
| 2002/0174179 A1* | 11/2002 | Toyota et al. | 709/203 |
| 2003/0050986 A1* | 3/2003 | Matthews et al. | 709/206 |
| 2005/0022203 A1* | 1/2005 | Zisapel et al. | 718/105 |
| 2005/0149619 A1 | 7/2005 | Cowan et al. | |
| 2005/0203931 A1 | 9/2005 | Pingree et al. | |
| 2006/0036456 A1* | 2/2006 | Wu | 705/1 |
| 2006/0230021 A1* | 10/2006 | Diab et al. | 707/3 |
| 2006/0230061 A1* | 10/2006 | Sample et al. | 707/103 R |
| 2006/0248050 A1* | 11/2006 | Brooks et al. | 707/3 |
| 2007/0106649 A1 | 5/2007 | Moore | |
| 2007/0239726 A1 | 10/2007 | Weiss et al. | |
| 2008/0010343 A1 | 1/2008 | Escaffi et al. | |
| 2008/0098005 A1* | 4/2008 | Goradia | 707/10 |

OTHER PUBLICATIONS

"Community Server", Telligent Systems, Inc., pp. 49.
"Community Information Database", retrieved at <<http://www.warwickshire.gov.uk/Web/corporate/pages.nsf/Links/88A1F7D975E9A98380256CC200366BF8>>, pp. 3.
Harth, et al., "Linking Semantically-Enabled Online Community Sites", Proceedings of the 1st Workshop on Friend of a Friend, Social Networking and the (Semantic) Web (FOAF Galway), Sep. 2004, pp. 15.

* cited by examiner

*Primary Examiner* — Lynn Feild
*Assistant Examiner* — Lin Liu
(74) *Attorney, Agent, or Firm* — Alleman Hall McCoy Russell & Tuttle LLP (57) ABSTRACT

A computerized collaboration system includes a core corpus of community-communication modules. Each of the community-communication modules may be propagated to a syndicate of portals that subscribe to that community-communication module. Further, upon receiving an update to a community-communication module from a portal of a syndicate subscribing to the community-communication module, the community-communication module may be modified according to the update and an updated version of the community-communication module may be propagated to all portals of the syndicate of portals subscribing to that community-communication module.

19 Claims, 6 Drawing Sheets

COMPUTERIZED COMMUNITY COMMUNICATION AND COLLABORATION

BACKGROUND

In an educational environment, individuals may gather together to form a community in order to foster communication and collaboration among the individuals. A computerized version of an educational community may be embodied by a community website hosting one or more references, such as message boards, wikis, blogs, catalogs of learning assets, etc. An individual may teach other individuals of the community by contributing to references on the community website. Likewise, an individual may learn from other individuals of the community by viewing the references on the community website.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A computerized collaboration system includes a core corpus of community-communication modules. Each of the community-communication modules of the core corpus may be propagated to a syndicate of portals that subscribe to that community-communication module. An update to a community-communication module may be received from a portal of a syndicate subscribing to the community-communication module. The community-communication module may be modified according to the update. The modified version of the community-communication module may then be propagated to all portals of the syndicate of portals subscribing to that community-communication module.

DETAILED DESCRIPTION

The present disclosure is directed to an approach for facilitating communication and collaboration between members of a network community. An online educational community is a nonlimiting example of a network community that may take advantage of such communication and collaboration. While described in the context of an online educational community below, it should be understood that the present disclosure is not limited to online educational communities. To the contrary, the computerized collaboration systems of the present disclosure may be used by virtually any network community.

Figure 1:
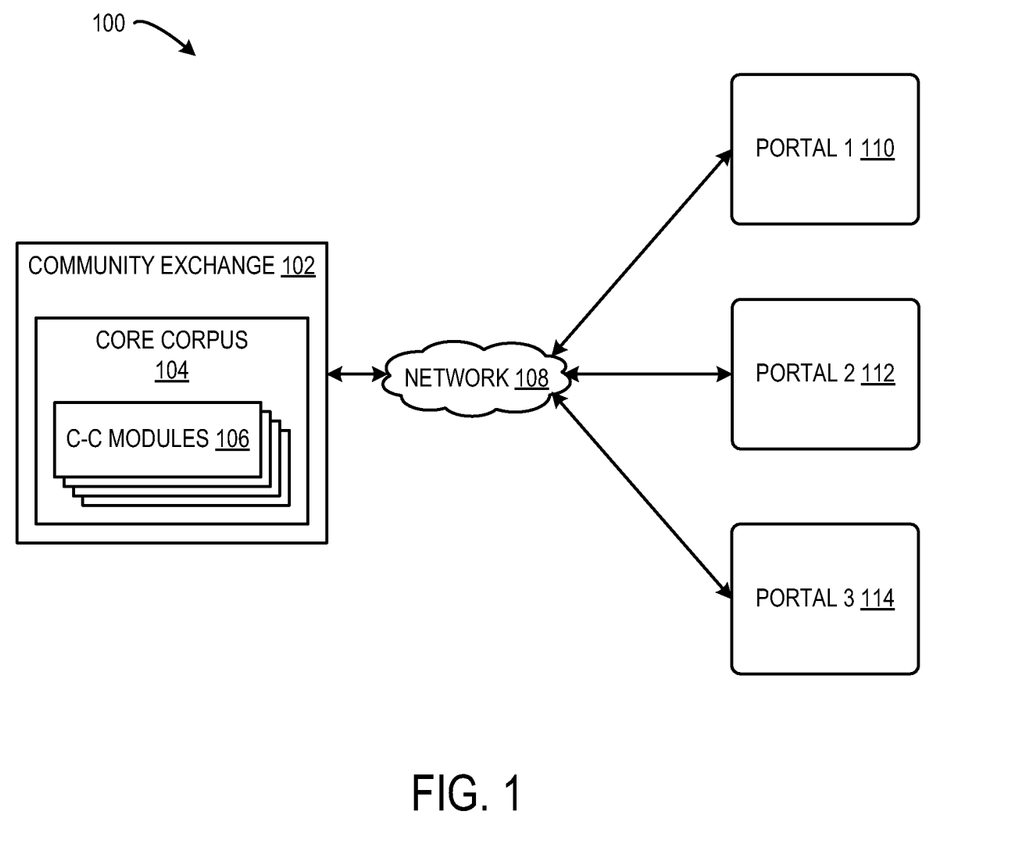
FIG. 1 schematically shows a computerized collaboration system according to an embodiment of the present disclosure.

FIG. 1 schematically shows a nonlimiting example of a computerized educational collaboration system 100 in accordance with the present disclosure. Computerized educational collaboration system 100 includes a plurality of portals (i.e., first portal 110, second portal 112, third portal 114) in communication with a community exchange 102 via a network 108.

Community exchange 102 includes a core corpus 104 generated through collaboration of members of the community. Core corpus 104 may include one or more community-communication modules 106 that are accessible by community exchange 102. Each community-communication module may include a web log, a wiki, a message board, or some other mechanism that allows one or more members of a community to share information and/or collaborate with other members of the community.

Community-communication modules 106 may facilitate collaboration by being configured to be viewed and/or updated by members of the community remotely at one or more of the portals. In particular, each of community-communication modules 106 may be configured for modular propagation to a syndicate of portals subscribing to that community-communication module. As such, each time a community-communication module is updated, the updated version of the community-communication module may be propagated to all portals of the syndicate.

Figure 2:
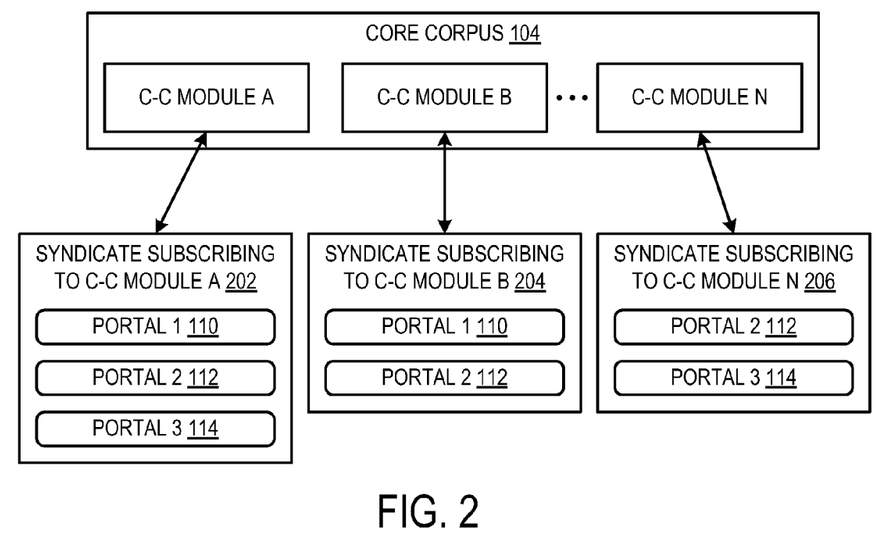
FIG. 2 schematically shows syndicates of portals subscribing to community-communication modules of a core corpus.

FIG. 2 schematically shows a nonlimiting example of various syndicates of portals subscribing to different community-communication modules of the core corpus. In the illustrated example, core corpus 104 may include community-communication module A, community-communication module B, and community-communication module N, among other community-communication modules.

A first syndicate 202 subscribing to community-communication module A may include a first portal 110, a second portal 112, and a third portal 114. Since first portal 110, second portal 112, and third portal 114 belong to first syndicate 202, community-communication module A may be viewed and updated at each of first portal 110, second portal 112, and third portal 114. Further, upon acceptance of an update to community-communication module A generated at one of the portals of first syndicate 202, an updated version of community-communication module A may be propagated to all portals of first syndicate 202, namely, first portal 110, second portal 112, and third portal 114.

A second syndicate 204 subscribing to community-communication module B may include first portal 110 and second portal 112. Since first portal 110 and second portal 112 belong to second syndicate 204, community-communication module B may be viewed and/or updated at each of first portal 110 and second portal 112. Further, upon acceptance of an update to community-communication module B generated at one of the portals of second syndicate 204, an updated version of community-communication module B may be propagated to all portals of second syndicate 204, namely, first portal 110 and second portal 112.

A third syndicate 206 subscribing to community-communication module N may include second portal 112 and third portal 114. Since second portal 112 and third portal 114 belong to third syndicate 206, community-communication module N may be viewed and/or updated at each of second portal 112 and third portal 114. Further, upon acceptance of an update to community-communication module N generated at one of the portals of third syndicate 206, an updated version of community-communication module N may be propagated to all portals of third syndicate 206, namely, second portal 112 and third portal 114.

Figure 3:
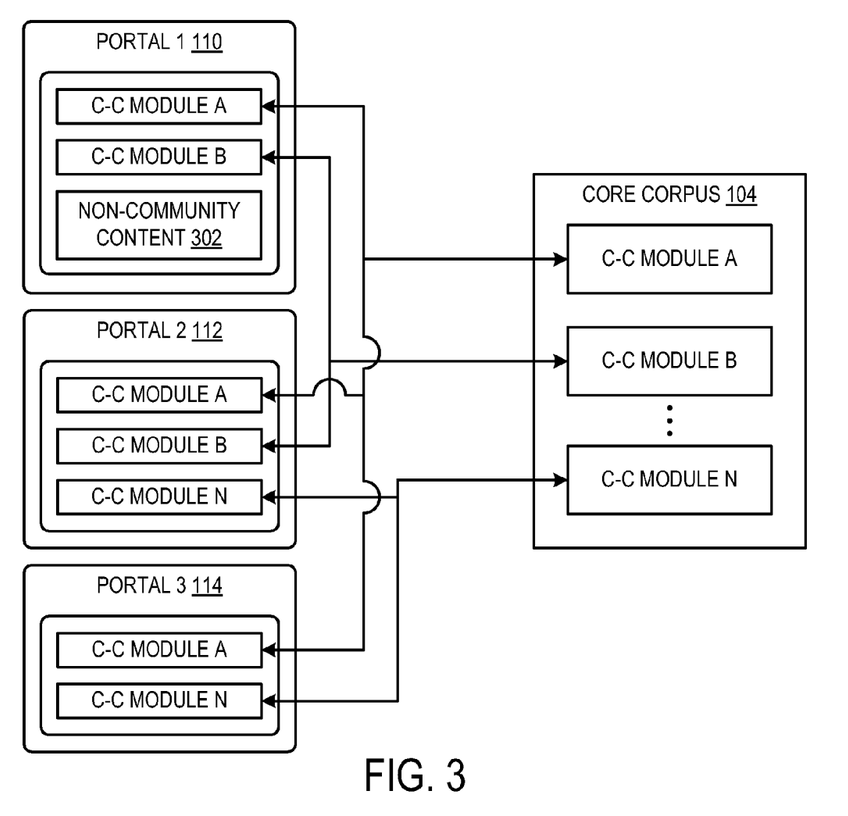
FIG. 3 schematically shows syndicated community-communication modules being presented at different portals.

It will be appreciated that, in the above described example, a portal may subscribe to a plurality of syndicates in order to view and/or update different community-communication modules. As shown in FIG. 3, first portal 110 may include community-communication module A and community-communication module B, as well as non-community content 302. Non-community content 302 may include content from sources other than core corpus 104, such as content from a third-party website, for example. Second portal 112 may include community-communication module A, community-communication module B, and community-communication module N. Third portal 114 may include community-communication module A and community-communication module N.

In one particular nonlimiting example, the community-communication modules correspond to pedagogical skills. As an example, community-communication module A may include a high level message board related to the skill of math, community-communication module B may include a more focused message board related to the math skill of calculus, and community-communication module N may include a high level message board related to the skill of science. Further, the first portal may be a website of a math department at a university, the second portal may be a website of a student attending the university, and the third portal may be a general college level educational website.

In this particular example, the first portal (i.e., the math department website) may belong to syndicates subscribing to the math and calculus message boards to serve as references for students and professors. The math and calculus message boards at the first portal may provide students the opportunity to post questions or discussion topics that may be answered by teachers or other students. The first portal allows the students to update both the math and calculus message boards from the same location (e.g., website). In other words, a student can use two completely different message boards from the same portal without having to navigate directly to either of the message boards.

Likewise, the first portal may provide the professors the opportunity to update the math and calculus message boards with answers to the students' questions without having to navigate directly to either of the message boards.

As discussed above in the context of the math and calculus message boards, a single portal can provide access to a community-communication module from a single location (e.g., website). A portal may further present site specific content outside the scope of that offered via any of the community-communication modules. For example, the first portal may present themed content relevant to a particular school, or private content a particular school does not want to share with the community or store in the core corpus. As another example, the first portal may present math related content from a source outside of the community, such as listings of math fellowship and research opportunities that may only be relevant to students and teachers at a particular location.

The second portal (i.e., the student's website) may subscribe to the math, calculus, and science message boards to serve as study references for the student (or others interacting with the student website) because the student is attending a calculus class and a science class. The math, calculus, and science message boards at the second portal may provide the student the opportunity to view and/or update the math, calculus, and science message boards without having to navigate directly to each of the message boards.

The third portal (i.e., the college level educational website) may subscribe to the math and science message boards to serve as references for any member interacting with the third portal, such as students and/or professors from various universities. The math and science message boards at the third portal may provide a member with the opportunity to view and/or update the message boards without having to navigate directly to each of the message boards.

By enabling different community-communication modules to be included in a single portal via subscription to one or more syndicates, a subset of community-communication modules may be selected according to the requisites of a member or group of members. In other words, each portal can be customized to include only those community-communication modules in which a member or group of members is interested. Each portal can serve as launch-pad for any number of different research, collaboration, communication, or other activities supported by the various community-communication modules to which the portal subscribes. In this way, the focus and efficiency of communication and collaboration of members of a community may be improved. Moreover, because the community-communication modules are stored in a centralized location (i.e., the core corpus) and propagated to portals via syndication, the portals need not be required to have resources and tools to host a plurality of collaborative references.

Each portal may be built in virtually any manner desired. The look, feel, and/or non-community content of a portal need not be constrained by any particular conventions. As an example, a portal need not be manifested in a web browser, but instead may be accessible from a rich client or a mobile device. As described below, one or more community-communication modules may effectively be plugged-in to the portal in a modular manner. In this way, a portal may maintain autonomy with respect to the community exchange, while at the same time enjoying the benefits of one or more of the community-communication modules.

It will be appreciated that a portal may include virtually any type of website or other content distribution mechanism accessible via the Internet and/or another network using virtually any type of remote access application (e.g., a web browser). As another example, a portal may include a non-browser format such as a mobile website displayable on a mobile device. Further, it will be appreciated that a portal may include non-community content (e.g., local and/or remote content not originating at the community exchange nor delivered via a community-communication module). Further still, it will be appreciated that a community-communication module need not be a message board, but may be virtually any type of communicative and/or collaborative reference, such as a web log (a.k.a. a "blog") or a wiki, for example.

In some embodiments, a community-communication module may be classified as public, private, or hybrid. A public community-communication module may be configured to permit viewing and updating by all portals (or members). A private community-communication module may be configured to permit viewing only by portals (or members) of a syndicate subscribing to that community-communication module and may be configured to permit updating only by portals (or members) or select portal(s) (or select member(s)) of a syndicate subscribing to that community-communication module. A hybrid community-communication module may be configured to permit viewing by all portals (or members)

and may be configured to permit updating only by portals (or members) or select portal(s) (or select member(s)) of a syndicate subscribing to that community-communication module. It will be appreciated that, in some cases, private and/or hybrid community-communication modules may be viewable only at subscribing portals and may not be viewable at the community exchange based on the permissions of the community-communication module.

Figure 4:
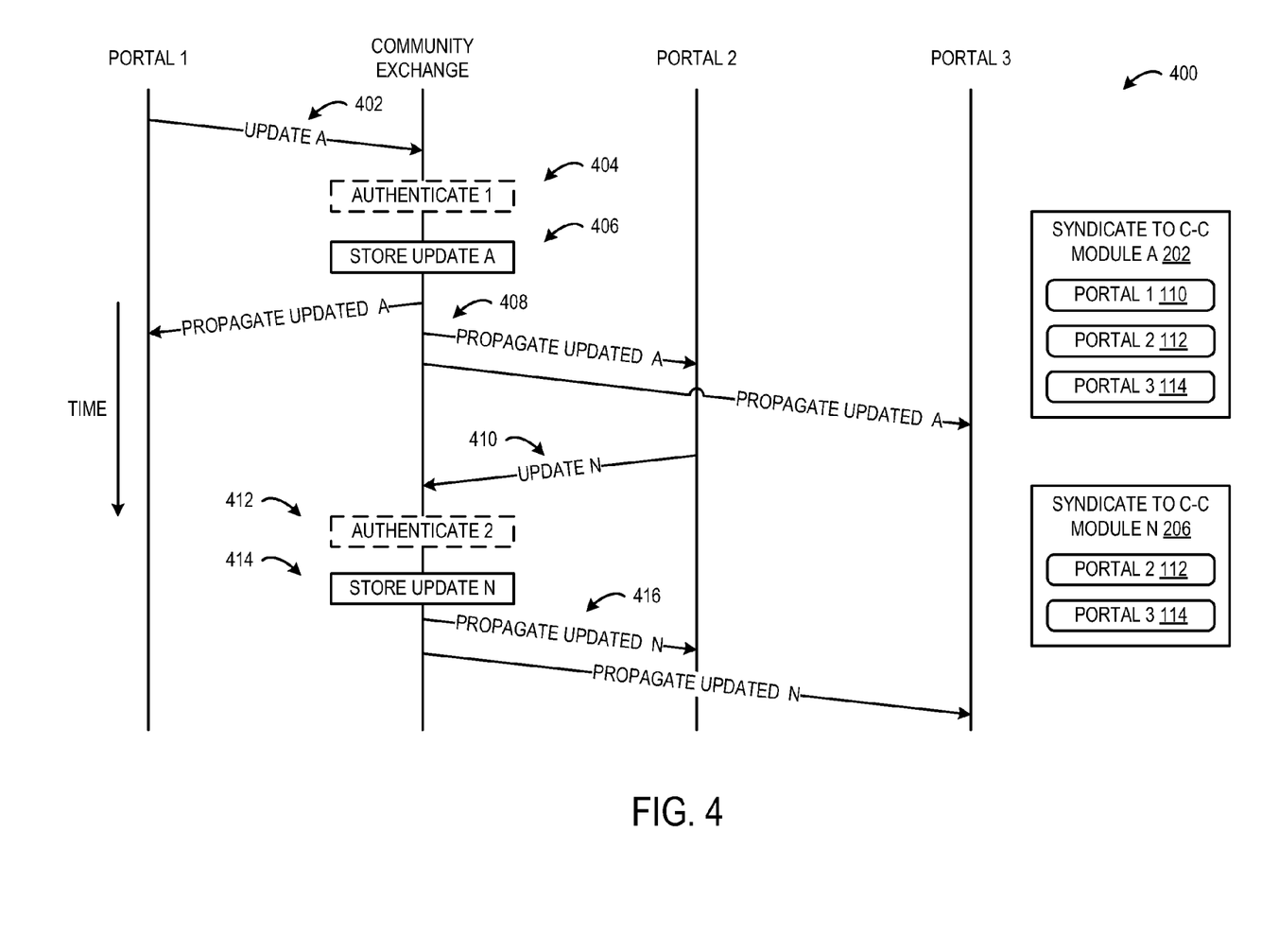
FIG. 4 is a sequence diagram illustrating examples of propagation of a community-communication module to all portals of a syndicate in response to receiving an update to the community-communication module.

FIG. 4 shows a sequence diagram illustrating several examples of propagation of a community-communication module to portals of a syndicate in response to the community-communication module being updated. In this example, first syndicate 202 may subscribe to community-communication module A and may include first portal 110, second portal 112, and third portal 114. Third syndicate 206 may subscribe to community-communication module N and may include second portal 112 and third portal 114.

Sequence diagram 400 begins at 402, where an update to community-communication module A is generated at the first portal and sent to the community exchange. In some cases, upon receiving an update at the community exchange, a portal (or member who authored the update) may be authenticated by the community exchange prior to modifying the community-communication module. For example, a portal or author may be authenticated if the community-communication module is classified as being private or hybrid. In some embodiments, authentication of a portal (or member) may be performed upon opting into a syndicate or creating a community-communication module, and an authenticated portal (or member) may be granted the ability to provide updates to a community-communication module.

In some cases, upon receiving an update at the community exchange, the content of the update may be authenticated by the community exchange prior to modifying the community-communication module. For example, the content of the update may be authenticated for accuracy or relevance. Thus at 404, the community exchange may selectively authenticate the update to community-communication module A, the first portal, and/or a member interacting with the first portal.

At 406, community-communication module A may be modified according to the update and stored in the core corpus. At 408, the updated version of community-communication module A may be propagated to all portals of the syndicate of portals subscribing to community-communication module A. In particular, the updated version of community-communication module A may be propagated to the first portal, the second portal, and the third portal.

Continuing with sequence diagram 400, another example propagation sequence begins at 410, where an update to community-communication module N is generated at the second portal and sent to the community exchange. At 412, the community exchange may selectively authenticate the update to community-communication module N, the second portal, and/or a member interacting with the second portal. At 414, community-communication module N may be modified according to the update and stored in the core corpus. At 416, the updated version of community-communication module N may be propagated to all portals of the syndicate of portals subscribing to community-communication module N. In particular, the updated version of community-communication module N may be propagated to the second portal and the third portal. Because the first portal does not subscribe to community-communication module N, the update is not propagated to the first portal.

By syndicating a community-communication module to a plurality of portals, the community-communication module may be updated at any of the portals of the syndicate. Further, by propagating an updated version of a community-communication module to each portal of the syndicate subscribing to the community-communication module, each portal may be automatically presented with the newest version of the community-communication module without having to repeatedly check the community-communication module for new content directly at the community exchange.

Figure 5:
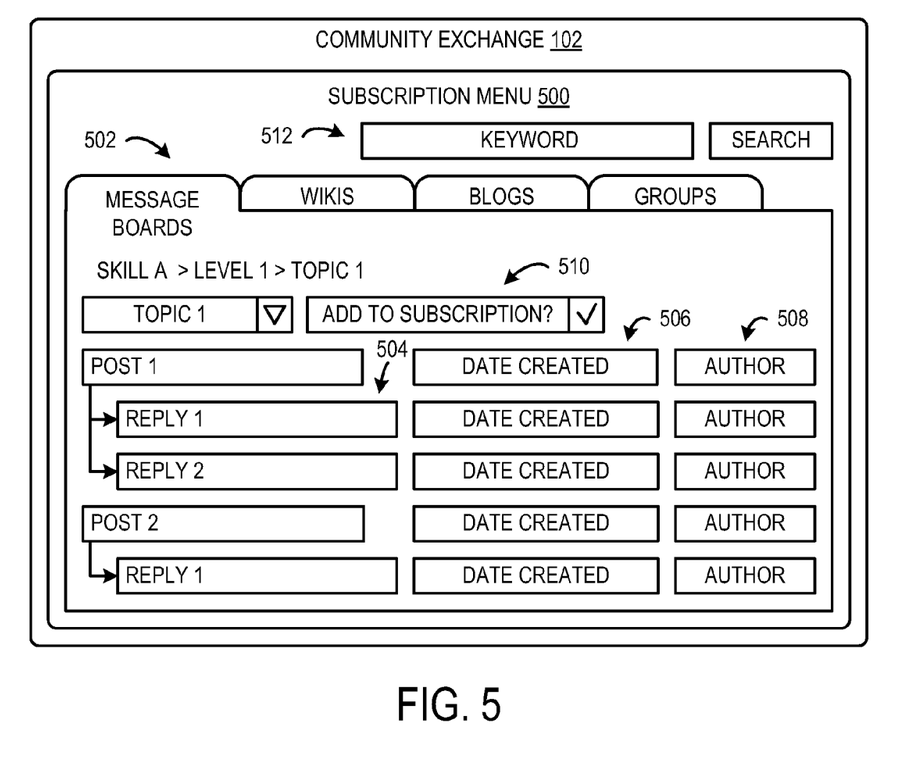
FIG. 5 schematically shows a graphical user interface of a subscription menu of a community exchange.

FIG. 5 shows a graphical user interface of an example subscription menu 500 that may be presented by community exchange 102. As indicated at 502, community exchange 102 may present all of the community-communication modules of the core corpus. The community-communication modules may be organized according to a predefined schema. Each community-communication module of the core corpus may be tagged with metadata that is classified according to the predetermined schema. In this particular example, the community-communication modules are categorized according to the type of collaborative reference, namely, message boards, wikis, blogs, and groups. Within each type category, the community-communication modules may be organized according to skills, levels, topics, or virtually any other categorization.

In the particular example of a message board, the granularity of a community-communication module may be further refined to specific posts and replies 504. Each post and reply 504 may include a creation date identifier 506 and/or an author identifier 508. In some embodiments, the author identifier may identify a portal. In some embodiments, the author identifier may identify a member.

Subscription menu 502 may offer an independently selectable subscription 510 to each community-communication module in the core corpus of community-communication modules. Further, subscription menu 502 may be configured to facilitate subscription to different levels of a community-communication module. For example, a subscription may be created for a particular skill, a skill level, a topic, etc. In the example of a message board, the subscription may be configured to facilitate subscription to one or more different threads of the message board.

Furthermore, subscription menu 502 may be configured to facilitate subscription to a selected subset of different community-communication modules in the core corpus of community-communication modules. For example, different types of community-modules having a relationship may be selected for subscription. In one particular example, a subscription to the topic of calculus that includes a message board and a blog relating to calculus may be created. In another particular example, a subscription to a particular author may be created, the subscription including the author's blog as well as all posts on message boards and wikis by the author.

Subscription menu 502 may include a search engine having a search field 512, the search engine being configured to search the core corpus of community-communication modules and retrieve one or more community-communication modules from the core corpus of community-communication modules. In some embodiments, the community-communication modules are retrieved based on metadata that is tagged to the community-communication modules. In particular, a keyword may be entered into search field 512 and the search engine may search the metadata for the keyword and retrieve the community-communication modules having matching or relevant metadata. As an example, the search engine may search the metadata based on one or more of pedagogical skill, date of entry, and identity of author or content thereof. The search engine may be used by members to find community-communication modules relating to a desired topic in order to establish subscription and thereby customization of a particular portal. In some embodiments, the search engine may be implemented as a community-communication module so that the core corpus may be searched from a portal without having to navigate directly to the community exchange.

It should be understood that the above described subscription menu, which is implemented using a graphical user interface, is a nonlimiting example of possible subscription menus. A subscription menu may include any collection of two or more community-communication modules. Further, a subscription menu may allow for customized selection of the community-communication modules via virtually any mechanism, including, but not limited to, graphical user interfaces.

Figure 6:
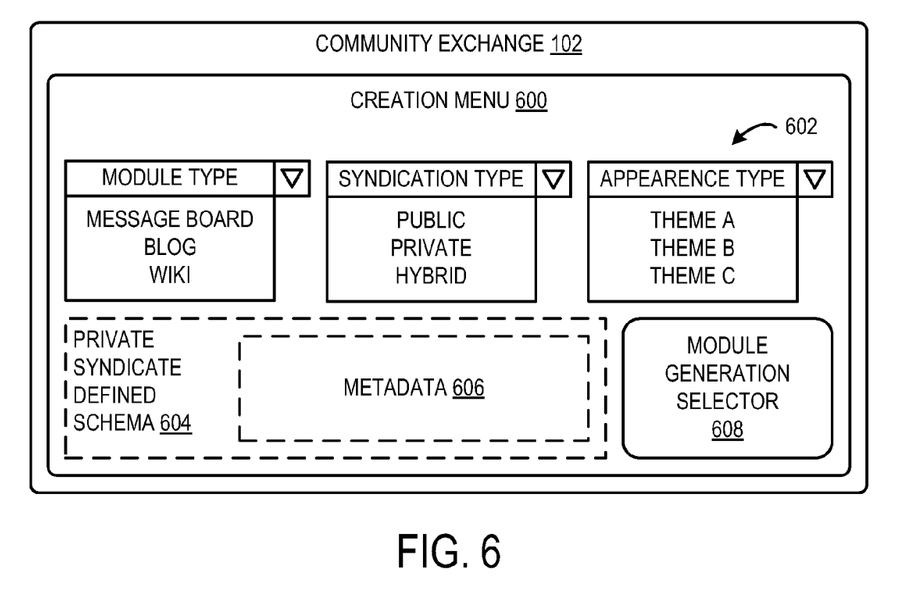
FIG. 6 schematically shows a graphical user interface of a creation menu of the community exchange.

FIG. 6 shows a graphical user interface of an example creation menu 600 that may be presented by community exchange 102. Creation menu 600 may be configured to facilitate creation of a community-communication module. In particular, creation menu 600 may include customization lists 602, such as a list of module types, a list of syndication types, and a list of appearance types. The module type list may include selections of different kinds of modules. For example, the module type selections may include message boards, blogs, wikis, and catalogues of learning assets. It will be appreciated that other types of modules may be included in the list of module types.

The syndication type list may include selections of different kinds of syndications. For example, the syndication type list may include public, private, and hybrid types with full variation of permissions for public read, public write, private read, private write, or any combination thereof. It will be appreciated that other types of syndication may be included in the syndication type list.

The appearance type list may include selections of different kinds of themes. For example, appearance type list may include a theme A, a theme B, and a theme C. As a particular example, a theme may include a color scheme, a font type, a module size, and a module layout. It will be appreciated that the appearance type list may include various other themes and/or individual customizations that may be used to customize the appearance of a community-communication module. In some embodiments, a "theme" of a community-communication module may be called by a script or other mechanism used by a portal to incorporate content from the community-communication module into the portal.

As discussed above, community-communication modules of the core corpus may be tagged with metadata that may be organized according to a predefined schema. For example, the schema may link metadata according to categories, subjects, and relationships. In the case where a created community-communication module is classified as a private community-communication module, the private community-communication module may be organized according to a schema that is defined by the subscribing syndicate. In one example, private syndicate defined schema 604 may include metadata 606 that is organized according to the interests of the members of the subscribing syndicate. For example, a private syndicate defined schema for one or more community-communication modules associated with a university may include particular components that apply to the university such as different restrictions or added functionally based on the type of individual (e.g., student, professor, administrator, etc.) interacting with the community-communication module.

Creation menu 600 may include a module generation selector 608. Module generation selector 608 may be configured to initiate creation of a community-communication module. In some embodiments, module generation selector 608 may be configured to generate a script that may be used to embed the newly created community-communication on a portal. The script may be configured to syndicate functionality of a community-communication module, such as construction of message boards, blogs, wikis, and catalogues of learning assets at a portal. In some examples, the script is a hyper text markup language (HTML) script that can be incorporated into the HTML code that defines the portal. Such a script is a nonlimiting example of a modular way in which a portal (e.g., a website) can easily incorporate a community-communication module while maintaining content and design flexibility. Further, this modular approach can facilitate the incorporation of two or more different community-communication modules into the portal, while, at the same time, providing the portal with the flexibility to select and incorporate virtually any desired non-community content.

It will be appreciated that the creation menu may enable new community-communication modules to be created beyond what is maintained in the core corpus. Furthermore, newly created community-communication modules may be stored in the core corpus to increase the amount and variety of content for subscription.

Figure 7:
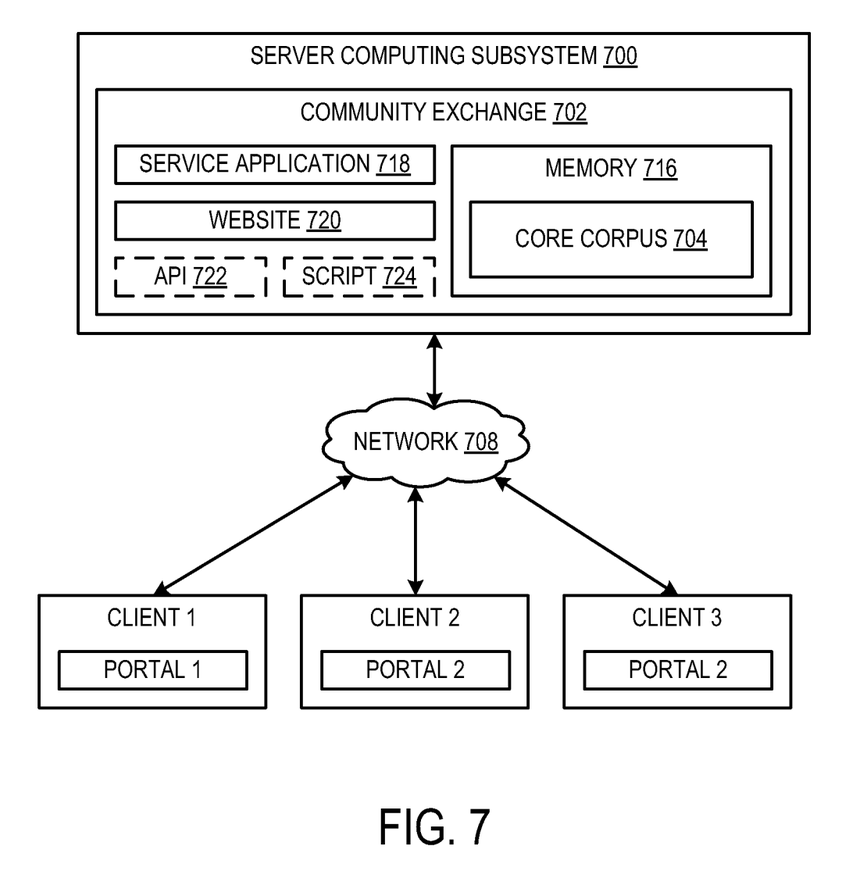
FIG. 7 schematically shows an embodiment of the computerized collaboration system of FIG. 1.

FIG. 7 schematically shows an embodiment of a computerized hardware system on which an educational communication and collaboration system may be implemented. In the illustrated example, a core corpus 704 of community-communication modules may be stored in a memory 716 of a server computing subsystem 700. A community exchange 702, executable on server computing subsystem 700, may be configured to retrieve community-communication modules of core corpus 704 from memory 716 and present the community-communication modules on a website 720 or other suitable networked content distribution mechanism. Website 720 may include community-communication module creation, searching, and subscription functionalities as described above.

In some embodiments, the memory may be remote from the server computing subsystem. In some embodiments, the website of the community exchange need not be configured to present any or all of the community-communication modules of the core corpus.

Furthermore, community exchange 702 may include a service application 718 that is executable on server computing subsystem 700. Service application 718 may be configured to propagate each community-communication module to a syndicate of portals subscribing to that community-communication module, to modify each community-communication module in accordance with updates received from any portal of the syndicate of portals subscribing to that community-communication module, and to propagate an updated version of each community-communication module to all portals of the syndicate of portals subscribing to that community-communication module.

Community-communication modules may be propagated by community exchange 702 to a plurality of portals executable on remote client computing devices (i.e., first client, second client, third client) over a network 708 based on syndication of the community-communication modules. A client computing device may be virtually any suitable type of computing device capable of displaying a portal, such as a rich client, a thin client, a mobile device, etc.

In some embodiments, the plurality of portals may be different websites, which need not be associated with the community or hosted by the server computing subsystem, but instead may be hosted by various other third parties. In some examples, one or more community-communication modules may be presented on the websites along with other content sourced from third parties. Further, each community-communication module may be updated from any client device presenting the portal subscribing to that community-communication module.

In some embodiments, each community-communication module may be modularly propagated via a script 724. As discussed above, script 724 may be generated in response to creation of a community-communication module. In some examples, a script may be cooperatively presented with a community-communication module on the community exchange website and may be used to access the community-communication module from a portal.

In some embodiments, each community-communication module may be modularly propagated via an application programming interface (API) 722. API 722 may be reusable by developers of third party portals in order to display functionality of a community-communication module.

Network 708 may include virtually any type of network infrastructure. For example, the network may include a wide area network (WAN) and/or a local area network (LAN). As one example, propagation of a community-communication module is performed over the Internet. As another example, propagation of a community-communication module is performed over an intranet on a LAN.

Figure 8:
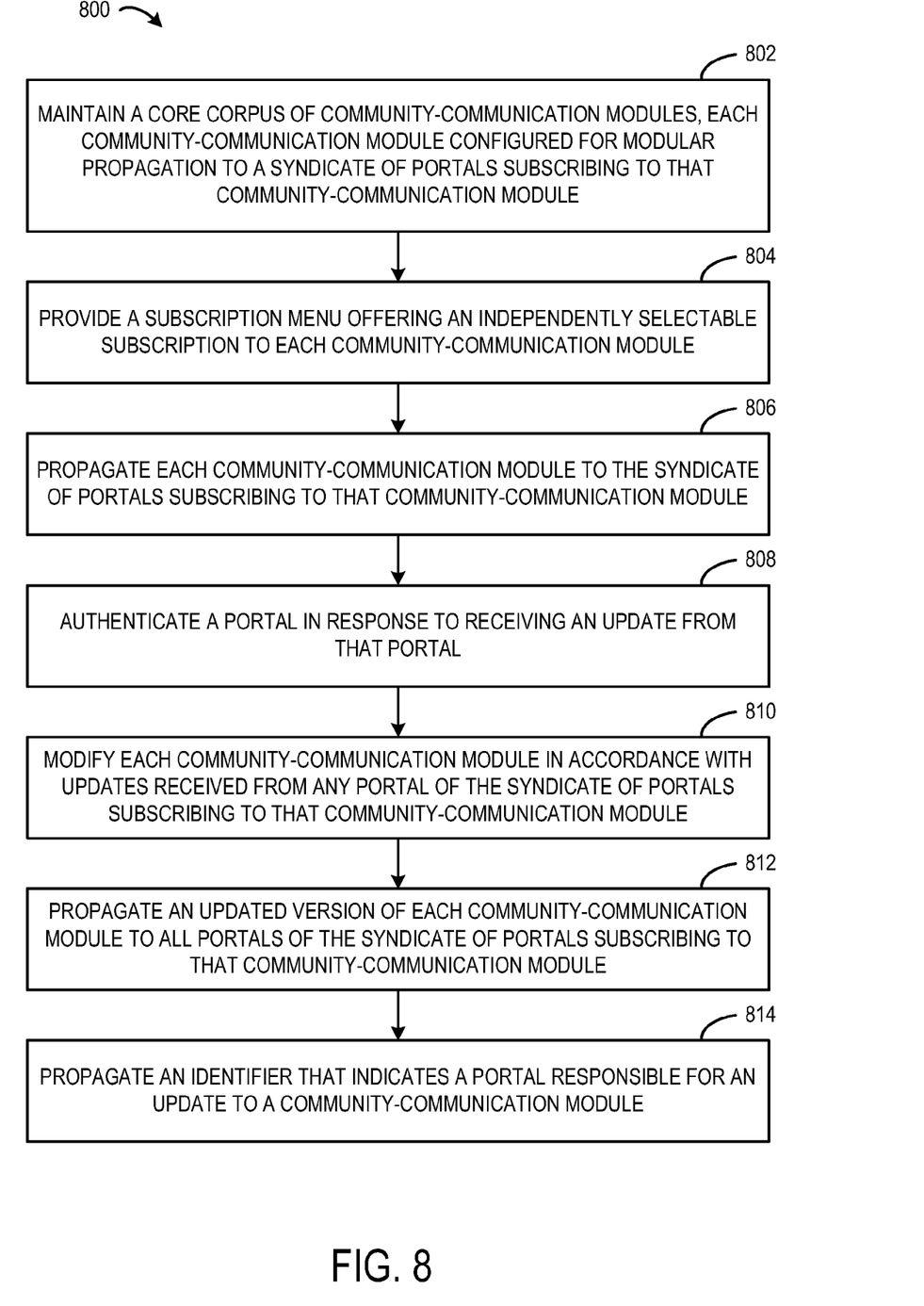
FIG. 8 is a flowchart of a method of facilitating community communication via syndication of community-communication modules of a core corpus.

FIG. 8 shows a flowchart of an example method of facilitating community communication. Flowchart 800 begins at 802, where the method may include maintaining a core corpus of community-communication modules, each community-communication module being configured for modular propagation to a syndicate of portals subscribing to that community-communication module. As described above, the core corpus may be maintained by the community exchange.

At 804, the method may include providing a subscription menu offering an independently selectable subscription to each community-communication module in the core corpus of community-communication modules. Further, it will be appreciated that the subscription menu may be configured to offer a subscription to a subset of community-communication modules of the core corpus and/or different levels of a community-communication module.

At 806, the method may include propagating each community-communication module to the syndicate of portals subscribing to that community-communication module. In some embodiments, propagation of a community-communication module may be performed by an application service via an API or a script.

At 808, the method may include authenticating a portal before modifying the community-communication module in response to receiving an update from that portal. Further, the update itself may be authenticated instead of or in addition to authentication of a portal.

At 810, the method may include modifying each community-communication module in accordance with updates received from any portal of the syndicate of portals subscribing to that community-communication module. Modification of a community-communication module may include storing an updated version of the modified community-communication module in the core corpus. In some cases, a community-communication module may be modified at a portal and the modifications may be viewed at other subscribing portals without being stored at the community exchange based on permissions of the community-communication module.

At 812, the method may include propagating an updated version of each community-communication module to all portals of the syndicate of portals subscribing to that community-communication module.

At 814, the method may include propagating an identifier that indicates a portal responsible for an update to a community-communication module. In some embodiments, the identifier may include the author responsible for creating the update.

It will be appreciated that the embodiments described herein may be implemented, for example, via computer-executable instructions or code, such as programs, stored on computer-readable storage media and executed by a computing device, such as a processor of server computing subsystem, for example. Generally, programs include routines, objects, components, data structures, and the like that perform particular tasks or implement particular abstract data types. As used herein, the term "program" may connote a single program or multiple programs acting in concert, and may be used to denote applications, services, or any other type or class of program. Likewise, the terms "computer" and "computing device" as used herein include any device that electronically executes one or more programs, including, but not limited to, personal computers, servers, laptop computers, hand-held devices, microprocessor-based programmable consumer electronics and/or appliances, etc.

It should be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of any of the above-described processes may be changed without parting from the scope of this disclosure.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computerized educational collaboration system comprising:
a core corpus of community-communication modules stored in memory, each community-communication module configured for modular propagation to a syndicate of portals subscribing to a corresponding community-communication module, each portal configured to modularly propagate different content via a plurality of different community- communication modules having different network locations from a common network location that is accessible by a plurality of different community members, each portal concurrently presenting content from the plurality of different community-communication modules to which the particular portal subscribes from a common network location of a corresponding portal;
a community exchange to present the core corpus of community-communication modules and provide a subscription menu offering an independently selectable subscription to each community-communication module in the core corpus of community-communication modules, the community exchange including at least one public community-communication module configured to permit viewing and updating by all portals of the community exchange, at least one private community-communication module configured to permit viewing only by portals of a syndicate subscribing to the private community-communication module and permit updating only by portals of a syndicate subscribing to the private community-communication module, and at least one hybrid community-communication module configured to permit viewing by all portals of the community exchange and permit updating only by portals of a syndicate subscribing to the hybrid community-communication module, the community exchange being configured to automatically propagate each community-communication module to the syndicate of portals subscribing to the corresponding community-communication module, to modify each community-communication module in accordance with updated content provided by a community member at any associated portal of the syndicate of portals subscribing to the corresponding community-communication module, and to propagate an updated version of each community-communication module including the updated content to all portals of the syndicate of portals subscribing to the corresponding community-communication module in response to said modifying each community-communication module.

2. The system of claim 1, wherein the subscription menu is configured to facilitate subscription to a selected subset of different community-communication modules in the core corpus of community-communication modules.

3. The system of claim 1, wherein one or more community-communication modules are created by the community exchange.

4. The system of claim 1, wherein the community exchange is further configured to enable a community member to create a new community-communication module to be stored in the core corpus, the new community-communication module being syndicated based on permissions set upon creation of the new community- communication module.

5. The system of claim 1, wherein the community exchange includes a search engine configured to search the core corpus of community-communication modules according to one or more of pedagogical skill, date of entry, content, and identity of author and to retrieve one or more community-communication modules from the core corpus of community-communication modules.

6. The system of claim 1, wherein a community-communication module is configured to be presented with non-community content on a subscribing portal.

7. The system of claim 1, wherein each community-communication module is modularly propagated via a script.

8. The system of claim 1, wherein each community-communication module is modularly propagated via an application programming interface.

9. The system of claim 1, wherein a community-communication module includes a collaborative reference.

10. The system of claim 1, wherein a community-communication module includes one or more of a web log and a catalogue of learning assets.

11. The system of claim 1, wherein a community-communication module includes a message board.

12. The system of claim 11, wherein the subscription menu is configured to facilitate subscription to one or more different threads of the message board.

13. A method of facilitating community communication, comprising:
   maintaining a core corpus of community-communication modules at a community exchange computer, each community-communication module configured for modular propagation via a computer network to a syndicate of portals subscribing to a corresponding community-communication module, each portal configured to modularly propagate different content via a plurality of different community-communication modules having different network locations from a common network location that is accessible by a plurality of different community members, each portal concurrently presenting content from the plurality of different community-communication modules to which the particular portal subscribes from a common network location of a corresponding portal;
   providing a subscription menu offering an independently selectable subscription to each community-communication module in the core corpus of community- communication modules; the community exchange including at least one public community-communication module configured to permit viewing and updating by all portals of the community exchange, at least one private community-communication module configured to permit viewing only by portals of a syndicate subscribing to the private community-communication module and permit updating only by portals of a syndicate subscribing to the private community-communication module, and at least one hybrid community-communication module configured to permit viewing by all portals of the community exchange and permit updating only by portals of a syndicate subscribing to the hybrid community-communication module,
   propagating each community-communication module from the community exchange computer to the syndicate of portals subscribing to the corresponding community-communication module;
   modifying each community-communication module at the community exchange computer in accordance with updated content provided by a community member and received at any associated portal of the syndicate of portals subscribing to the corresponding community-communication module;
   and in response to modifying each community-communication module, propagating an updated version of each community-communication module including the updated content from the community exchange computer to all portals of the syndicate of portals subscribing to the corresponding community-communication module.

14. The method of claim 13, further comprising: authenticating a portal before modifying the community-communication module in response to receiving an update from that portal.

15. The method of claim 13, further comprising: propagating an identifier that indicates a portal responsible for an update to a community-communication module.

16. The method of claim 13, wherein the subscription menu is configured to facilitate subscription to different levels of a community-communication module.

17. A computer-readable memory device storing instructions that, when executed by a processor:
   maintain a core corpus of community-communication modules at a community exchange computer, each community-communication module configured for modular propagation via a computer network to a syndicate of portals subscribing to a corresponding community-communication module, each portal configured to modularly propagate different content via a plurality of different community-communication modules having different network locations from a common network location that is accessible by a plurality of different community members, each portal concurrently presenting content from the plurality of different community-communication modules to which the particular portal subscribes from a common network location of a corresponding portal;

provide a subscription menu offering an independently selectable subscription to each community-communication module in the core corpus of community- communication modules; the community exchange including at least one public community-communication module configured to permit viewing and updating by all portals of the community exchange, at least one private community-communication module configured to permit viewing only by portals of a syndicate subscribing to the private community-communication module and permit updating only by portals of a syndicate subscribing to the private community-communication module, and at least one hybrid community-communication module configured to permit viewing by all portals of the community exchange and permit updating only by portals of a syndicate subscribing to the hybrid community-communication module, propagate each community-communication module from the community exchange computer to the syndicate of portals subscribing to the corresponding community-communication module;

upon receiving an update of content for a community-communication module at the community exchange computer, authenticate the update of content prior to modifying the community-communication module;

modify each community-communication module at the community exchange computer in accordance with updated content provided by a community member and received at any associated portal of the syndicate of portals subscribing to the corresponding community-communication module; and in response to modifying each community-communication module, automatically propagate an updated version of each community-communication module including the updated content from the community exchange computer to all portals of the syndicate of portals subscribing to the corresponding community-communication module.

18. The computer-readable memory device of claim 17, wherein the one or more private community-communication modules are selectively modified based on authentication of a portal responsible for an update.

19. The computer-readable memory device of claim 17, wherein the one or more private community-communication modules are organized according to a schema defined by the subscribing syndicate.

\* \* \* \* \*